UNITED STATES PATENT OFFICE.

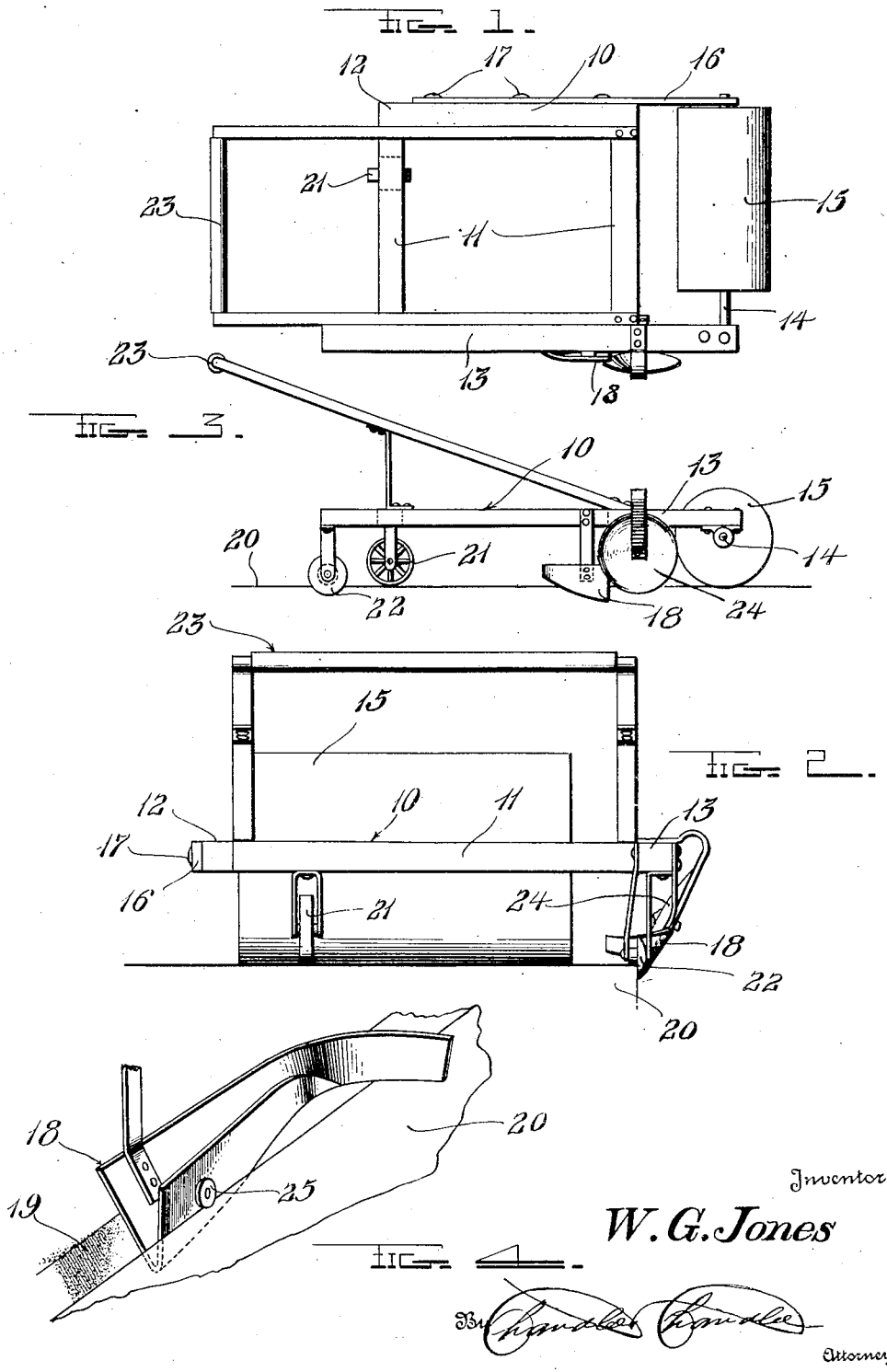

WHITMAN G. JONES, OF GREAT FALLS, MONTANA.

SIDEWALK-PLOW.

1,337,076.

Specification of Letters Patent.   Patented Apr. 13, 1920.

Application filed October 9, 1919. Serial No. 329,418.

*To all whom it may concern:*

Be it known that I, WHITMAN G. JONES, a citizen of the United States, residing at Great Falls, in the county of Cascade, State of Montana, have invented certain new and useful Improvements in Sidewalk-Plows; and I do hereby declare the following to be a full, clear, and exact description of the invention, such as will enable others skilled in the art to which it appertains to make and use the same.

This invention relates to an improvement in plows, more particularly to an improved roller or side-walk plow, designed to be rolled along a side-walk in order to cut channels at either side or along the paralleling edges of the side-walk for draining or other purposes.

Among the important objects of the invention are to provide an improved device of the above character which is simple in construction, economical to produce, strong and durable and which is designed to be pushed along by hand or otherwise, the device operating on the side-walk and having a plow share designed to cut a channel along the edges of the walk, preferably of V-shaped cross section, the device being capable of accurate control and easily guided.

With the above objects and others in view as will appear as the description proceeds, the invention comprises certain novel combinations and arrangement of parts as will hereinafter be more particularly described and claimed.

Reference is had to the accompanying drawings forming a part of this application wherein like reference characters designate corresponding parts throughout the several views, and wherein—

Figure 1 is a plan view of my improved side-walk plow.

Fig. 2 is a rear elevation thereof, and

Fig. 3 is a side elevation.

Fig. 4 is a detail perspective view showing the plow share and its arrangement.

Referring to the drawings in detail, my improved side-walk or roller plow comprises a frame 10 preferably rectangular and including spaced cross beams 11, a side beam 12 and an opposite side beam 13 which is projected beyond the forward cross beam 11 to produce a bearing for the end of a shaft or axle 14 carrying the roller 15 of tile or other desirable material and weight. Secured to the beam 12 is a bearing arm 16 bolted thereto as shown at 17 and receiving the opposite end of the axle or shaft 14, with the roller snugly fitting against the arm 16 but not contacting therewith. It should also be noted that the roller is spaced from the beam 13.

Arranged at the same side as the beam 13, is a plow share 18 extending from the beam 11 at the rear end substantially across the frame at an acute angle and then inwardly toward the axle at the forward end, presenting a V-shaped blade designed to cut a channel as indicated at 19, at each side of the side-walk 20. The channel will be provided with a vertical wall at the edge of the side-walk and a sloping wall outwardly thereof to provide for drain or other purposes such as to prevent the overgrowth of grass or weeds with respect to the side-walk.

In order to advance the vehicle, it is supported at its rear end upon a revolving caster 21 arranged beneath the rear cross bar 11 adjacent to the side bar 12; and at the rear end of the beam 13 which projects beyond the rear cross beam 11, there is disposed a guide wheel or disk 22 horizontally arranged or journaled to travel upon the side-walk and engaging the same at its edge portion. In this manner, positive and uniform action of the plow is insured as the same is advanced through the medium of a handle 23 preferably of U-shaped form and secured to the side beam 12 and respective cross beams 11, rearwardly of which said handle projects so that it may be easily grasped by the operator for advancing the machine.

It will thus be seen that I have provided a very efficient and simple form of sidewalk or roller plow for the purposes stated, and one which can be readily and economically produced and assembled and which will efficiently carry out the object specified.

Also, there is provided a rolling colter 24 beneath the plow share for cutting the sod and growth that overlies the side-walk, while fastened beneath the plow share is a small friction roller 25 to glide or run along the side-walk underneath the plow share to regulate the action thereof.

What is claimed is:

1. A side-walk plow comprising a frame, a roller rotatably supporting the frame and constituting pressure exerting means therefor, a plow share along one side of the frame and extending beneath the same and below the bearing portion of the cylinder, and means carried by the frame to engage along the edge of the side-walk for guiding the device.

2. A side-walk plow comprising a frame, a roller rotatably supporting the frame and constituting pressure exerting means therefor, a plow share along one side of the frame and extending beneath the same and below the bearing portion of the cylinder, a revolving caster at the rear of the frame, a handle for the frame, and a guide wheel carried by the frame having a flange designed to engage the edge of the side-walk, said plow share being designed to produce a V-shaped channel in the ground adjacent to said edge.

3. A side-walk plow, comprising a supporting frame, a plow share provided at one side of the frame, a rolling colter beneath said plow and a friction roller to engage the side-walk beneath the plow share.

In testimony whereof I affix my signature in the presence of two witnesses.

WHITMAN G. JONES.

Witnesses:
R. M. MESSICK,
GEO. H. MINSON.